Figure 1:
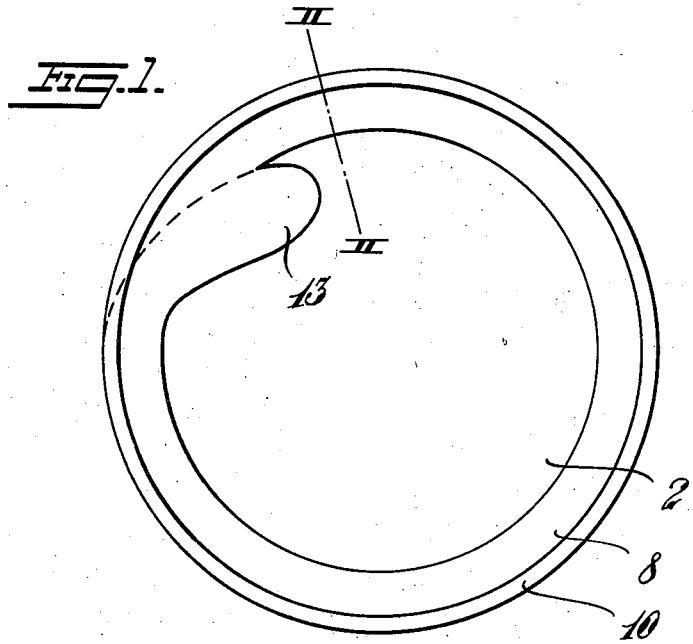

Jan. 18, 1938.  A. F. TOBIASSON  2,105,798
VESSEL OR BOX FOR CANNING
Filed May 29, 1936

Inventor
Anders F. Tobiasson
By Sommers & Young  attys

Patented Jan. 18, 1938

2,105,798

UNITED STATES PATENT OFFICE 2,105,798

VESSEL OR BOX FOR CANNING

Anders Fredrik Tobiasson, Lysekil, Sweden

Application May 29, 1936, Serial No. 82,601
In Sweden October 23, 1934

2 Claims. (Cl. 220—61)

This invention refers to vessels or cans of sheet metal for preserving and conserving (canning) purposes, having a removable lid.

The chief object of this invention is to effect a simple but still very efficient and reliable connection between the vessel and the lid. Such connections of this type were heretofore often unreliable. Another object of the invention is to render it possible to remove the lid without damaging the same. Another object is to render the seal between vessel and lid hermetic and resistant, even if a pressure above atmospheric is originated within the vessel.

Another object is to create a seal between vessel and lid that may easily be broken intentionally, but remains hermetic and safe, even if it is handled roughly and stored indefinitely.

One embodiment is shown in the drawing.

Figure 2:
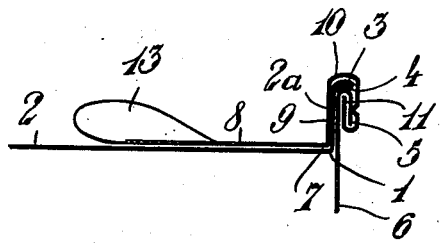
Figure 3:
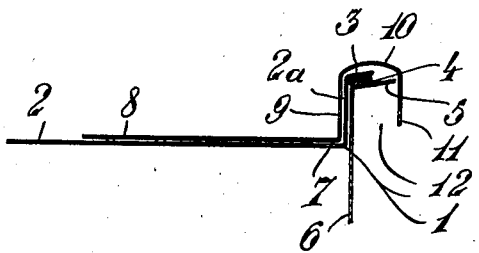

Fig. 1 is a plan view of a preserving vessel in accordance with this invention. Fig. 2 is a section on the line II—II in Fig. 1, on a larger scale, through the joint between lid and vessel. Fig. 3 is a similar cross-section showing the parts, before the lid has been joined to the vessel.

The lid 1 has a central recess 2 and an edge 2a projecting upwards and also bent outwardly to a flange 3. The vessel has a side wall 6 whose edge 5 is bent outwards. On the edge or flange 5 a sealing ring 4 is laid and on that ring the flange 3 of the lid rests, as shown in Fig. 3.

Thereafter, an annular joining or connecting member 7 is laid upon the lid. The member 7 has a portion 8 engaging the bottom of the recess 2. From the outer edge of the portion 8 a substantially cylindric portion 9 of the member 7 extends upwards, is bent outwards at 10 and then bent downwards at 11. The channel formed by the portions 9, 10, 11 thus embraces the edge portions 2a, 3, and 5 of the lid and the vessel (Fig. 3).

By means of a suitable folding machine the edge portion 11 is first bent inwards to engage the flange 5. Thereafter the two flanges 11 and 5, which now form a substantially right (or obtuse) angle with the wall 6, and partially also the portion 10 are jointly folded down along the outside of the wall 6, as shown in Fig. 2. At this, the connecting member 7 presses the lid flange 3 against the sealing ring 4 and effects a safe and hermetic joint between the lid and the vessel. The portions 8 and 9 of the member 7 are inside the fold and make the joint between the lid and the vessel very resistive to any superatmospheric pressure that may be originated within the vessel.

For the sake of clearness the parts are drawn somewhat apart in Fig. 2. In reality, the sheets lie close upon each other after the folding procedure.

To open the vessel a tongue or flap 13 projecting inwards from the member 7 is grasped by the fingers or a key and pulled outwards to tear the member 7 open on the dotted line shown in Fig. 1 and then on a line somewhat outside the outer edge of the flange 3, when the pulling is continued. After the inner portions 8 and 9 of the member 7 have thus been removed, the lid may easily be removed without being damaged.

What I claim is:—

1. In a canning vessel of sheet metal, in combination, a lid having a central recess, and having an outwardly bent undoubled, single-sheet edge portion, the vessel having an outwardly bent single-sheet edge portion, a sealing ring between said two edge portions, and a continuous, seamless, annular connecting member formed with a channel-shaped cross section, enclosing the edge portions of the lid and vessel together with said sealing ring, said connecting member being doubled twice and together with the edge portion of the vessel being folded down closely along the wall of the vessel, whereby the connecting member is firmly clamped between the wall of the vessel and the folded down edge portion of the vessel.

2. In a sheet metal can for preserves, having a single-sheet outwardly bent edge portion, in combination, a lid having a central recess, said lid having an outwardly bent undoubled single-sheet edge portion, a sealing ring between said two edge portions, a continuous, seamless, annular connection member having an offset portion engaging the recess of said lid from above, said connecting member having a channel-shaped portion enclosing said two edge portions together with said sealing ring, said channel-shaped portion being doubled to engage the outwardly bent edge portion of said can and doubled together with said last-mentioned edge down tightly along the side of said can, whereby a part of said connecting member is firmly clamped between the side wall of the can and the outwardly bent edge portion of the can.

ANDERS FREDRIK TOBIASSON.